(12) United States Patent
Goldman

(10) Patent No.: US 10,459,711 B2
(45) Date of Patent: Oct. 29, 2019

(54) UPDATING APPLICATIONS USING MIGRATION SIGNATURES

(75) Inventor: Oliver Goldman, Redwood City, CA (US)

(73) Assignee: ADOBE INC., San Jose, CA (US)

( * ) Notice: Subject to any disclaimer, the term of this patent is extended or adjusted under 35 U.S.C. 154(b) by 2233 days.

(21) Appl. No.: 12/190,460

(22) Filed: Aug. 12, 2008

(65) Prior Publication Data
US 2014/0040873 A1 Feb. 6, 2014

(51) Int. Cl.
*G06F 8/65* (2018.01)
*G06F 21/57* (2013.01)
*H04L 9/32* (2006.01)
*G06F 21/64* (2013.01)

(52) U.S. Cl.
CPC ............... *G06F 8/65* (2013.01); *G06F 21/57* (2013.01); *G06F 21/64* (2013.01); *H04L 9/3263* (2013.01); *H04L 2209/64* (2013.01); *H04L 2209/68* (2013.01)

(58) Field of Classification Search
None
See application file for complete search history.

(56) References Cited

U.S. PATENT DOCUMENTS

| | | | |
|---|---|---|---|
| 5,844,986 A * | 12/1998 | Davis | 713/187 |
| 6,125,388 A | 9/2000 | Reisman | |
| 6,223,291 B1 | 4/2001 | Puhl et al. | |
| 6,557,054 B2 * | 4/2003 | Reisman | 710/33 |
| 6,687,745 B1 | 2/2004 | Franco et al. | |
| 7,017,004 B1 * | 3/2006 | Calligaro | G06F 12/0223 365/230.01 |
| 7,069,452 B1 * | 6/2006 | Hind | G06F 21/572 713/1 |
| 7,331,063 B2 * | 2/2008 | Gunyakti et al. | 726/30 |
| 7,555,657 B2 * | 6/2009 | Nasu | 713/191 |
| 7,685,594 B2 | 3/2010 | Yamamoto et al. | |
| 7,735,057 B2 | 6/2010 | Rachman et al. | |
| 7,739,681 B2 * | 6/2010 | Sinha et al. | 717/173 |
| 7,769,991 B2 | 8/2010 | Niemela | |
| 8,006,095 B2 * | 8/2011 | Berenbaum et al. | 713/180 |
| 8,055,910 B2 * | 11/2011 | Kocher | G06F 21/10 280/228 |
| 8,230,415 B1 * | 7/2012 | Thomas | G06F 21/57 717/168 |

(Continued)

OTHER PUBLICATIONS

Windows Installer XML (WiX) Toolset, Microsoft Corporatin. (Year: 2005).*

(Continued)

*Primary Examiner* — Abhishek Vyas
*Assistant Examiner* — Murali K Dega
(74) *Attorney, Agent, or Firm* — Shook, Hardy & Bacon L.L.P.

(57) ABSTRACT

In general, in one aspect, an installation file digitally signed with a first package signature is received. It is determined whether the received installation file includes a migration signature that covers the first package signature and that matches a second signature associated with an installed software application, to confirm that the received installation file includes a valid update related to the installed software application. The installed software application is updated from the received installation file when the migration signature is included.

27 Claims, 9 Drawing Sheets

(56) References Cited

U.S. PATENT DOCUMENTS

| | | | |
|---|---|---|---|
| 2001/0029605 A1 | 10/2001 | Forbes et al. | |
| 2002/0002703 A1* | 1/2002 | Baentsch et al. | 717/11 |
| 2003/0188160 A1* | 10/2003 | Sunder | G06F 8/65 |
| | | | 713/165 |
| 2004/0139430 A1 | 7/2004 | Eatough et al. | |
| 2005/0257212 A1* | 11/2005 | Boyles et al. | 717/170 |
| 2006/0026587 A1* | 2/2006 | Lemarroy et al. | 717/170 |
| 2006/0101454 A1* | 5/2006 | Whitehead | G06F 21/121 |
| | | | 717/168 |
| 2006/0106806 A1* | 5/2006 | Sperling et al. | 707/10 |
| 2007/0006219 A1* | 1/2007 | Sinha et al. | 717/174 |
| 2007/0208931 A1 | 9/2007 | Koue et al. | |
| 2007/0214453 A1 | 9/2007 | Dive-Reclus | |
| 2007/0277168 A1* | 11/2007 | Vetillard | 717/170 |
| 2008/0127169 A1 | 5/2008 | Malasky et al. | |
| 2008/0127170 A1 | 5/2008 | Goldman et al. | |
| 2010/0017459 A1* | 1/2010 | Baentsch et al. | 709/203 |

OTHER PUBLICATIONS

U.S. Appl. No. 12/029,378, Goldman, et al., filed Feb. 11, 2008.

U.S. Appl. No. 12/001,497, William Ie, et al., filed Dec. 11, 2007.

Apple Computer, Inc. "Universal Binary Programming Guidelines, Second Edition", Jul. 24, 2006, retrieved from the internet at http://developer.apple.com/documentation/MacOSX/Conceptual/universal_binary/universal_binary.pdf, on Aug. 28, 2006, 96 pages.

Grimes, "Authenticode", retrieved from the internet at http://www.microsoft.com/technet/archive/security/topics/secaps/authcode.mspx on Jan. 10, 2008, 16 pages.

LaMonica, "Flash to Jump Beyond the Browser", May 11, 2006, retrieved from the internet at http://news.com.com/Flash+to+jump+beyond+the+browser/2100-1007_3-6071005.html, on Jul. 12, 2006, 6 pages.

Macromedia, Inc. "Publishing Flash Documents—Version 8", retrieved from the internet at http://livedocs.macromedia.com/flash/8/main/00000805.html, on Aug. 16, 2006, 2 pages.

Macrovision "InstallShield MultiPlatform 5 (incl. SP3)", Oct. 27, 2003, retrieved from the internet at http://www.installshield.com/downloads/imp/imp_readme53.asp, on Aug. 28, 2006, 10 pages.

Macrovision "InstallAnywhere 7.1 Users Guide", 2006, retrieved from the internet at http://www.macrovision.com/downloads/products/flexnet_installshield/installanywhere/documentation/ia71_user_guide.pdf, on Jul. 11, 2006, 121 pages.

Microsoft Corporation "Windows Installer XML (WiX) Toolset", 2005 retrieved from the internet at http://wix.sourceforge.net/manual-wix2/wix_index.htm, on Jul. 11, 2006, 392 pages.

Sun Microsystems, Inc. "JAR File Specification", retrieved from the internet at http://java.sun.com/j2se/1.4.2/docs/guide/jar/jar.html, on Jan. 10, 2008, 14 pages.

Sun Microsystems, Inc. "Packaging Programs in JAR Files", retrieved from the internet at http://java.sun.com/docs/books/tutorial/deployment/jar/, on Jul. 20, 2006, 2 pages.

Swftools, "Flash Projector/Swftools.com", retrieved from the internet at http://www.swftools.com/tools-category.php?cat=290, on Aug. 16, 2006, 3 pages.

W3C "XML-Signature Syntax and Processing", retrieved from the internet at http://www.w3.org/TR/xmldsig-core/on Feb. 10, 2008, 71 pages.

Housley, et al., *Internet X.509 Public Key Infrastructure Certificate and Certificate Revocation List (CRL) Profile*, RFC 3280, 127 pages, Apr. 2002.

*Tutorial Introduction Digital Certificates PKI Guide Encryption Signing Signature*, Verisign, www.verisign.com.au/repository/tutorial/digital/intro1.shtml, 5 pages, printed from Web on Dec. 2, 2007.

*Certificates and Certificate Authorities, Chapter 6—10.6—Fundamental Security Concepts*, http://ccfit.nsu.ru/~ilya/grid/manuals/globus/tutorial/ch10s04.html, 3 pages, printed from Web on Dec. 2, 2007.

* cited by examiner

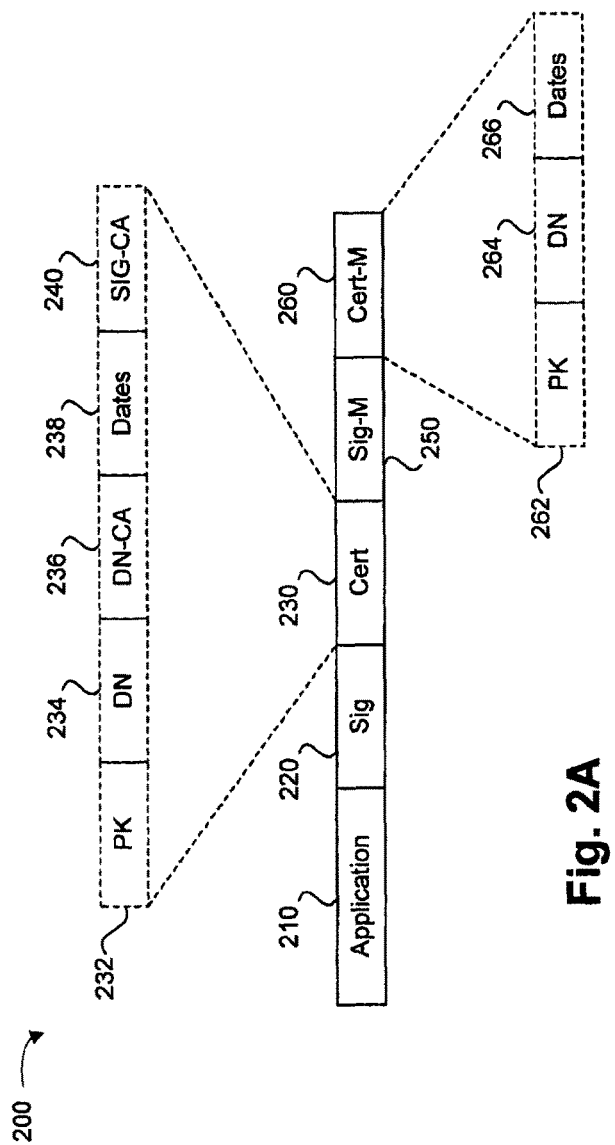
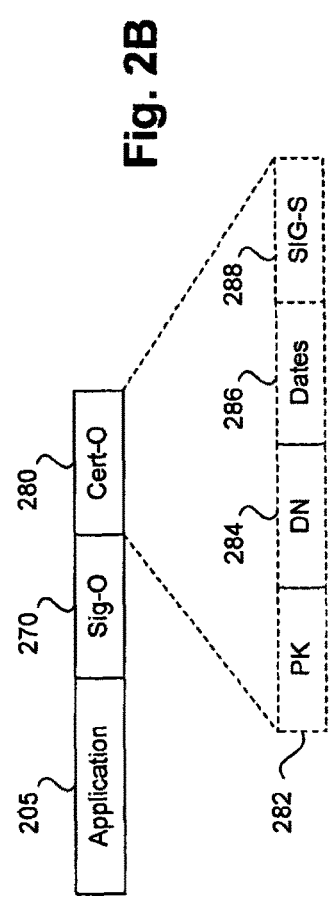
Fig. 2A
Fig. 2B

Fig. 7

```
<signatures>
  <Signature xmlns="http://www.w3.org/2000/09/xmldsig#" Id="PackageSignature">
    <SignedInfo>
      <CanonicalizationMethod Algorithm="http://www.w3.org/TR/2001/REC-xml-c14n-20010315"/>
      <SignatureMethod Algorithm="http://www.w3.org/TR/xmldsig-core#rsa-sha1"/>
      <Reference URI="#PackageContents">
        <Transforms>
          <Transform Algorithm="http://www.w3.org/TR/2001/REC-xml-c14n-20010315"/>
        </Transforms>
        <DigestMethod Algorithm="http://www.w3.org/2001/04/xmlenc#sha256"/>
        <DigestValue>...</DigestValue>
      </Reference>
    </SignedInfo>
    <SignatureValue Id="PackageSignatureValue">...</SignatureValue>
    <KeyInfo>
      <X509Data><X509Certificate>[new cert]</X509Certificate></X509Data>        712
    </KeyInfo>
    <Object>
      <Manifest Id="PackageContents">
        [references to all files in the package]
      </Manifest>
    </Object>
    [timestamp, if present]   714
  </Signature>
  <Signature xmlns="http://www.w3.org/2000/09/xmldsig#" Id="MigrationSignature">
    <SignedInfo>
      <CanonicalizationMethod Algorithm="http://www.w3.org/TR/2001/REC-xml-c14n-20010315"/>
      <SignatureMethod Algorithm="http://www.w3.org/TR/xmldsig-core#rsa-sha1"/>
      <Reference URI="#PackageSignatureValue">
        <Transforms>
          <Transform Algorithm="http://www.w3.org/TR/2001/REC-xml-c14n-20010315"/>
        </Transforms>
        <DigestMethod Algorithm="http://www.w3.org/2001/04/xmlenc#sha256"/>
        <DigestValue>...</DigestValue>
      </Reference>
    </SignedInfo>
    <SignatureValue>...</SignatureValue>
    <KeyInfo>
      <X509Data><X509Certificate>[old cert]</X509Certificate></X509Data>        722
    </KeyInfo>
    [timestamp, if present]   724
  </Signature>
</signatures>
```

710

720

UPDATING APPLICATIONS USING MIGRATION SIGNATURES

BACKGROUND

The present disclosure relates generally to installing software on computing platforms.

A computer platform can include a computer and an operating system (OS) running on that computer. Software developers can create code that can be compiled for respective computer platforms and then independently generate native installation packages. Each native installation package can be associated with a specific computer platform, and these native installation packages can be distributed for installation on appropriate machines. Software developers can also create platform independent or "cross-platform" installation packages. A cross-platform installation package can be installed using tools provided by the application developer and/or the developer of the cross-platform package format.

Installation files can be secured using digital certificates and signatures. Digital signature schemes can use public-private key pairs. A digital signature is an encrypted message that can be decrypted with the public key half of a public-private key pair. A file can be signed with a private key, and a digital certificate can include the public key for decryption. Digital signature schemes can use other techniques as well, such as symmetric (e.g., shared-key) techniques that use a shared key for both decryption and encryption.

A digital certificate typically has an associated digital signature and certifies that a particular encryption key belongs to a particular party (e.g., the publisher of a digitally signed application). A digital certificate typically includes information regarding a public key, the owner of the key and the identity of the certificate. The certificate uses a digital signature to bind the key with an identity, with the signature attesting that the identity and the key are validly linked.

A digital certificate can be issued by a trusted third party, such as a Certification Authority (CA). A CA-issued certificate can be signed by a CA private key to certify or attest that a particular encryption key belongs to a particular party (e.g., the certificate holder). Alternatively, a developer can sign an application using its own private key to create a self-signed certificate. With a self-sign certificate, the person issuing the certificate also attests to its validity. Whether CA-issued or self-signed, code signing is often used to secure the delivery and publishing of applications.

Software developers sometimes save money and/or time by using self-sign certificates. Later, they may want to switch to using CA-issued certificates, which can provide greater assurances to end users who are installing the applications. In order to protect the applications and end users, however, the target platform can require that updates to applications be signed by the same certificate as previous releases of the application.

SUMMARY

This specification describes technologies relating to migrating an application, for example, by changing an association between the application and a publisher of the application, which can be indicated in a digital certificate used to digitally sign the application. The application can be migrated to securely update the application between two different types of code signing certificates, which in some examples can also identify different publishers.

In general, in one aspect, a computer-implemented method is provided. The method includes: receiving an installation file digitally signed with a first package signature; determining whether the received installation file includes a migration signature that covers the first package signature and that matches a second signature associated with an installed software application, to confirm that the received installation file includes a valid update related to the installed software application; and updating the installed software application based on the received installation file when the migration signature is included. Other embodiments can include corresponding systems, apparatus and computer program products.

Implementations can include one or more of the following features. For example, in some implementations, the second signature is associated with a self-signed security certificate, and the first package signature is associated with a certificate issued by a certificate authority. The first package signature can be associated with a first public signing key, the second signature can be associated with a second public signing key different from the first public signing key, and the determining can comprise determining whether the received installation file includes a migration signature that is associated with the second public signing key.

In some implementations, determining whether the received installation file includes a migration signature that covers the first package signature and that matches a second signature associated with an installed software application involves comparing an identifier generated from the second signature with an identifier generated from the migration signature to determine whether or not the identifiers match and, when the identifiers match, determining that the migration signature matches the second signature.

In some implementations, the second signature and the migration signature are associated with different public signing keys and the method further involves: determining whether the first package signature of the installation file matches the second signature associated with the installed software application; updating the installed software application from the received installation file when the first package signature matches the second signature; and not updating the installed software application otherwise. Determining whether the first package signature matches the second signature can involve determining whether an identifier generated from the first package signature matches an identifier generated from the second signature.

In some implementations, receiving the installation file involves receiving an installation file, digitally signed with the first package signature, that includes an update to an association between the installed software application and an application publisher. In some implementations, the software application is installed and updated in a cross-platform runtime environment.

In some implementations, updating the installed software application based on the received installation file changes digital signatures associated with the installed software application without otherwise affecting the installed software application.

In general, in another aspect, a computer-implemented method includes: obtaining an installation file digitally signed with a first signature, the installation file corresponding to a software application previously installed on a computing platform, and the software application having a second signature associated with the installed software application on the computing platform; applying a migration signature to the installation file to generate a dual-signature installation file, the migration signature covering the first signature and matching the second signature associated with the installed software application to validate the first signature for association with the software application on the computing platform; and distributing the dual-signature installation package for use on the computing platform. Other embodiments can include corresponding systems, apparatus and computer program products.

Implementations can include one or more of the following features. For example, in some implementations, the second signature is associated with a self-signed security certificate, and the first signature is associated with a certificate issued by a certificate authority. In some implementations, the obtained installation file includes an update to functionality of the installed software application.

Aspects of the subject matter described in this specification can be implemented to realize one or more of the following and/or other advantages. Implementations consistent with this disclosure can facilitate updating an application to reflect a change in an association between the application and a publisher. In particular, an application can be migrated from having one particular application-publisher association to having another, different application-publisher association. In some examples, the publisher is the same before and after migration but identified by different digital certificates. In some examples, the application can be migrated from one publisher to another, different publisher. Implementations consistent with this disclosure can provide a mechanism to securely update an application from one type of code signing certificate to another, where the certificates can identify different publishers. Thus, for example, application publishers (e.g., software developers) can switch code signing certificates (or otherwise modify applications) using auto-update features and without requiring end users to uninstall/re-install different versions of the applications.

An application publisher can be acquired by another publisher, and/or an application can be purchased by a new publisher. In both of these situations, implementations consistent with this disclosure can facilitate migration of the application to a new certificate, which can also identify a new publisher.

The details of one or more embodiments of the subject matter described in this specification are set forth in the accompanying drawings and the description below. Other features, aspects, and advantages will become apparent from the description, the drawings, and the claims.

BRIEF DESCRIPTION OF THE DRAWINGS

FIGS. 2A and 2B are block diagrams collaboratively showing a conceptual overview of digital signatures and certificates.

FIG. 7 is a screen shot showing aspects of example signature formats.

Like reference numbers and designations in the various drawings indicate like elements.

DETAILED DESCRIPTION

Figure 1:
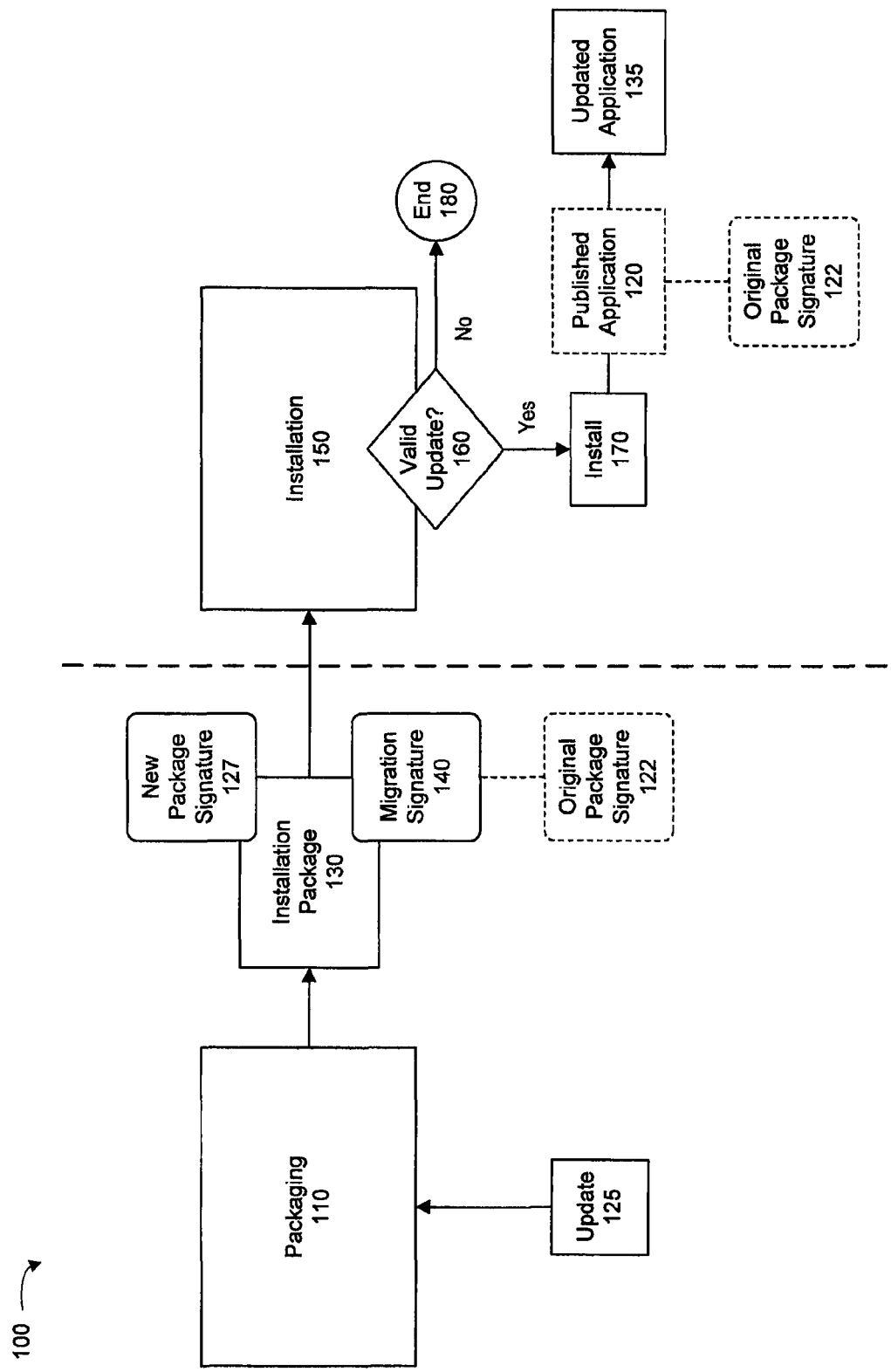
FIG. 1 is a diagram showing an example software installation workflow.

In some examples, an application can be migrated by changing an association between the application and a publisher of the application (for example, as indicated in a certificate used to digitally sign the application) to another application-publisher association. The publisher can be the same before and after migration but identified by different digital certificates, and/or the application can be migrated from one publisher to a different publisher. The application can be migrated from one type of code signing certificate to another type of certificate, where the new certificate can also identify a new publisher. This application migration is accomplished using a migration signature attesting to the validity of the update.

As used herein, signing an application with a certificate can refer, for example, to signing an application with a private key (e.g., encrypting a hash of an installation file with the private key), where the signature is associated with a digital certificate including the corresponding public key (for decryption) and confirming that the public key validly belongs to a particular identity (e.g., the publisher of the application). The certificate can bind the public key to the identity by digitally signing the public key (e.g., with another private key), and the certificate can accompany the signed installation file when it is provided to a target platform. This signature used to verify that the public key belongs to the certificate holder can be issued by a trusted third party, such as a certification authority (CA). Alternatively, the key holder itself (e.g., the application publisher) can sign the public key using its own private key, to create a self-signed certificate.

Additionally, signing an application can refer, for example, to signing an application with a shared key used in a symmetric, shared-key scheme (e.g., encrypting an installation file with a shared key that is the same as the key used for decryption). In such cases, asymmetric techniques (as discussed above) can be used to initially negotiate and distribute a shared key. Information included in digital certificates can be used to confirm identities and establish the shared key. However established, the shared key can then be used for both encryption and decryption during a communications session.

To illustrate aspects of using a migration signature, consider two code signing certificates, an OLD certificate (e.g., a self-signed certificate) and a NEW certificate (e.g., a CA-issued certificate), where an application has already been published and released, having been digitally signed with the OLD certificate. This application can be associated with a signed installation file OLD(File) used to install the application. For example, the application can be an Adobe® AIR™ application (that relies on the Adobe® AIR™ software, provided by Adobe Systems Inc. of San Jose, Calif.) having an associated signed .air file. In order to switch to a new code signing certificate (e.g., from a self-sign certificate to a CA-issued certificate), a publisher of the application (e.g., a software developer) can create a new version of the application signed with the NEW certificate. This new version may be identical to the original version except for the type of signature, and this new version can have an installation file NEW(File) used for installing the application.

To approve the migration from the old to new formats, a migration signature matching the original signature (OLD)

can be applied to the newly signed installation file (OLD (NEW(File))). The migration signature matches the original signature (OLD) in that the migration signature is associated with the same certificate as the original signature (OLD) or associated with a certificate that has the same identity (e.g., identical information fields and the same certificate chain to the root certificate). In some examples, the migration signature matches the original signature (OLD) in that the signatures have the same public keys, shared keys and/or publisher identifiers, additional details of which are discussed below in connection with accompanying figures. By covering the new signature with the migration signature, the publisher securely approves the migration between formats. The migration signature attests that the newly signed version of the application is a valid update to a version of the application already signed with the original certificate.

At installation time, the presence of the new signature and the migration signature is checked (e.g., by a runtime environment). If only the new signature is present, then the installation file can only update an installed application signed with the same certificate. If both the new signature and the migration signature are present, however, then the newly signed application can be used as an update to an application signed with either code signing certificate.

The above description is intended to provide a brief conceptual overview of some of the aspects consistent with this disclosure. The examples described above are not intended to be restrictive, and variations can be used without departing from the scope of this disclosure. Additional details of the aspects described above, and details of other features and aspects, are described below.

FIG. 1 shows an example software installation workflow 100 in which an identity of an application publisher, as determined by a code signing certificate, can be migrated to a new certificate. The workflow 100 is merely an example and not intended to be restrictive. Various modifications to the workflow 100 are therefore possible without departing from the scope of this disclosure.

As used herein, the term "application" refers to any computer program having some defined purpose appreciable by a user. An application can include various computer programs (also referred to as programs, software, software applications, software modules, or code), which contain instructions executable and/or interpretable by a processor. An application can include one or more files containing various information, such as source code, machine code, libraries, data, documentation, configuration information, icons, or any other resources that can be used by an application and the installation procedure for that application. An application (or portion thereof) can be platform dependent or independent.

The term application "publisher" refers to any entity that creates, updates, distributes, owns or otherwise controls an application. An application publisher can include, for example, a software developer.

In some examples, an application relies on an application runtime environment to operate. This runtime environment can include an operating system (OS) and a cross-platform runtime environment that sits above the OS. For example, an application can be an Adobe® AIR™ application, which can be created using various types of source files, such as SWF (Shockwave Flash) files, HTML (HyperText Markup Language) files, JavaScript files, JPEG (Joint Photographic Experts Group) files, etc. This type of application can rely on the Adobe® AIR™ software, provided by Adobe Systems Inc. of San Jose, Calif. The cross-platform runtime environment uses the operating system to interact with other elements of the computer and provide various support services to the application. For example, the runtime environment can include a cross-platform application program interface (API) that provides various services to applications and that abstracts details of hardware and OS platforms on which the runtime environment is configured to operate.

During a packaging 110 phase of the workflow 100, an installation package 130 is created to update 125 a published application 120. The published application 120 can include an application previously signed and distributed to an end-user system. The update 125 to the published application can include a modification of some aspect of that application. For example, the update can include a new version of the published application. The new version may include changes to features and functionality of the application, and/or it can include a change from one code signing certificate to another. Thus, the application itself need not have changed aside from the changed certificate.

As used herein, the terms "installation package" and "installation file" are interchangeable and refer to any file or other information component useable to install an application on a target computing platform. As used herein, a "file" need not be a single OS file object and can, in some examples, include multiple associated documents. The installation package 130 can include a native installation package associated with a specific computer platform, or it can include a cross-platform installation package (e.g., an Adobe® AIR™ application packaged into a single .air file for distribution to an end-user system).

The installation file 130 can include installation information and application content. In general, the installation information can include a description of all the items an installation sequence uses, and the program content can include (or reference) the resources used to form the application. The installation information can include, for example, information (e.g., stored in eXtensible Markup Language (XML)) used during installation, such as the application name, the application version, publisher name, an icon for the application, a default installation directory, file extensions registered by the application, and Multipurpose Internet Mail Extensions (MIME) content types registered by the application.

The published application 120 can be signed with an original package signature 122 associated with an original code signing certificate. This original certificate certifies that a particular encryption key (e.g., a public key) belongs to a publisher of the application 120. In some examples, the original package signature 122 can be associated with a self-signed certificate. That is, the publisher (e.g., a software developer) may have signed the published application 120 using its own private key to create a self-signed certificate.

The installation package 130 can be created to update 125 content or features provided in the published application 120. Additionally or alternatively, the installation package 130 can be created to update 125 (e.g., switch) a code signing certificate, for example, from a certificate associated with the signature 122 a new certificate associated with a new package signature 127. In some examples, an updated application 135 eventually installed from the update 125 in the installation package 130 is identical to the published application 120 but for a change in code signing certificates (which can also identify different publishers).

The code signing certificate associated with the new package signature 127 can be different than that of the original package signature 122. For example, the published application 120 can be signed with a self-sign certificate, while the installation package 130 can be signed with a CA (or other trusted third party) issued certificate, or vice versa. In contrast to a self-sign certificate, the CA-issued certificate can include a signature made by a trusted third party or CA.

A migration signature 140 is applied to the installation package 130 after the new package signature in order to cover the new package signature 127. The migration signature 140 attests that the installation package 130 includes a valid update 125 to the published application 120 and, by covering the new package signature, allows the publisher to securely approve the migration from the original to the new signature formats. In some examples, the migration signature 140 can be applied to the installation package 130 at a system different from that where the installation package 130 is created. For example, the software developer can provide the installation package 130 to a trusted third party in order to apply the migration signature 140.

To successfully validate the update, the migration signature 140 matches or corresponds to the original signature 122 associated with the published application 120. In some examples, to match the original signature 122, the migration signature 140 is associated with the same certificate as the original signature 122 or associated with a certificate that has the same identity (e.g., identical information fields and the same certificate chain to the root certificate). In some examples, for the signatures to match, the signatures have the same public keys (or public signing keys), shared keys and/or publisher identifiers. The public keys can be included in certificates, which can be sent with signed installation packages. In some implementations, shared keys can be pre-exchanged or established using asymmetric techniques. The publisher identifiers can be generated, for example, by processing (e.g., hashing) one or more portions of the certificates. Additional details regarding publisher identifiers are discussed below in connection with FIG. 5.

During the installation 150 phase of the workflow 100, the installation package 130 is received at a target computer (e.g., an end-user system). The installation phase 150 can involve determining 160 whether the installation package 130 includes a migration signature that covers the new package signature 127 and that matches the original signature 122 associated with the published application 120. This determination 160 serves to confirm whether or not the received installation package 130 includes a valid update 125 to the already-installed software application 120.

In some examples, the target computer includes an application runtime environment, such as the Adobe® AIR™ environment. The runtime environment can require the presence of the migration signature 140 before allowing the application 120 to be updated with the installation package 130. If the migration signature is included, the published application 120 can be updated (updated application 135) by installing 170 the update from the received installation package 130. The published application 120 can use a specific auto-update API mechanism to automatically update itself from the installation package 130 without having to un-install/re-install the old 120 and new 125 versions of the application.

If the migration signature does not match the original package signature, then a determination can be made as to whether the new package signature 127 of the installation package 130 matches the original package signature 122 associated with the published software application 120. If the new and original package signatures (127 and 122) match, then the published application 120 can be updated using the received installation file. If these signatures fail to match, then the installation phase 150 may end 180 without updating the application 120.

In some implementations, packaging and signing are separate phases. In such implementations, application files can be packaged at a packager's computer to form a distribution file. The distribution file can then be sent to a signer's computer, where the distribution file can be converted to an installation file by applying a digital signature. The installation file can then be sent to an installer's computer, where the application can be installed from the installation file. An advantage of this workflow is that packaging and signing can be readily kept separate, while also requiring that an application package be digitally signed to be installable.

FIG. 2A shows an example signed application installation package 200, which can be intended to serve as an update to a published application on a target platform. In this example, an application 210 includes a package signature (SIG) 220 associated with a digital certificate (CERT) 230. The package signature 220 can include the digital certificate 230, but these elements are shown separately for clarity of explanation.

The certificate 230 can include within it a public signing key (PK) 232 used for decryption. The certificate 230 can additionally include a distinguished name (DN) 234 associated with the owner of the public key 232, a distinguished name (DN-CA) 236 associated with the party issuing the certificate (e.g., a Certification Authority (CA)), and validity dates 238 of the certificate. The distinguished names 234 and 236 uniquely identify an associated entity and can include a common name, title, address, and other identifying information. In some examples, the certificate 230 can include an alternative name, such as an e-mail address or a DNS-entry. Various other information can be included in the certificate 230 as well.

The public key 232 can correspond to a private key used to sign the application (e.g., the private key used to encrypt a hash of an installation file). The certificate 230 can confirm that the public key 232 validly belongs to the party identified by the DN 234 (e.g., the publisher of the application). The certificate 230 can bind the public key 232 to this identity using a digital signature (SIG-CA) 240 associated with the party issuing the certificate 230. That is, the certificate 130 can digitally sign (240) the public key 232 with another private key associated with the certificate issuer.

As shown in FIG. 2A, the application 210 additionally includes a migration signature (SIG-M) 250 associated with a digital certificate (CERT-M) 260, which are shown separately for clarity of explanation. The certificate 260 can include within it a public signing key (PK) 262, a distinguished name (DN) 264 associated with the owner of the public key 262, validity dates 266 and various other information. The migration signature 250 covers the package signature 220 but can be different from the package signature 220 (e.g., it can be created using a different certificate). For example, the public key 262 included in the certificate 260 can be different from the public key 232 included in the certificate 230.

The migration signature 250 can be used to confirm that the application package 200 is a valid update to a version of the application already signed with a signature that matches the migration signature 250. The signatures match, for example, if they have matching public keys and/or matching publisher identifiers (which can be computed by a runtime environment). At installation time, the new version of the application can install if the presence of the matching migration signature is detected.

As an example, as shown in FIG. 2B, a published version 205 of the application can be already signed (and installed) with an original signature (SIG-O) 270 associated with a digital certificate (CERT-O) 280. The original certificate 280 includes within it a public signing key (PK) 282, a distinguished name (DN) 284 associated with the owner of the public key 282, validity dates 286 and various other information. The certificate 280 can also include a signature (SIG-S) 288 attesting that the public key 282 validly belongs to the party identified by the distinguished name 284. The original signature 270 can be different from the package signature 220 shown in FIG. 2A. For example, the original signature 270 can be associated with a self-signed certificate (e.g., in which the signature 288 can be of the public key 282 holder itself), while the package signature 220 can be associated with a CA (or other trusted third party) issued certificate. The public key 282 of the original certificate 280 can therefore be different from the public key 232 of the package signature 220.

The migration signature 250 can serve to confirm that the application package 200 is a valid update to the version 205 of the application if the migration signature 250 matches the original signature 270. This match can be detected, for example, when the public key 262 of the migration signature 250 is the same as the public key 282 of the original signature 270. In this case, the migration signature 250 allows the application to be updated between two different code signing certificates.

Figure 3A:
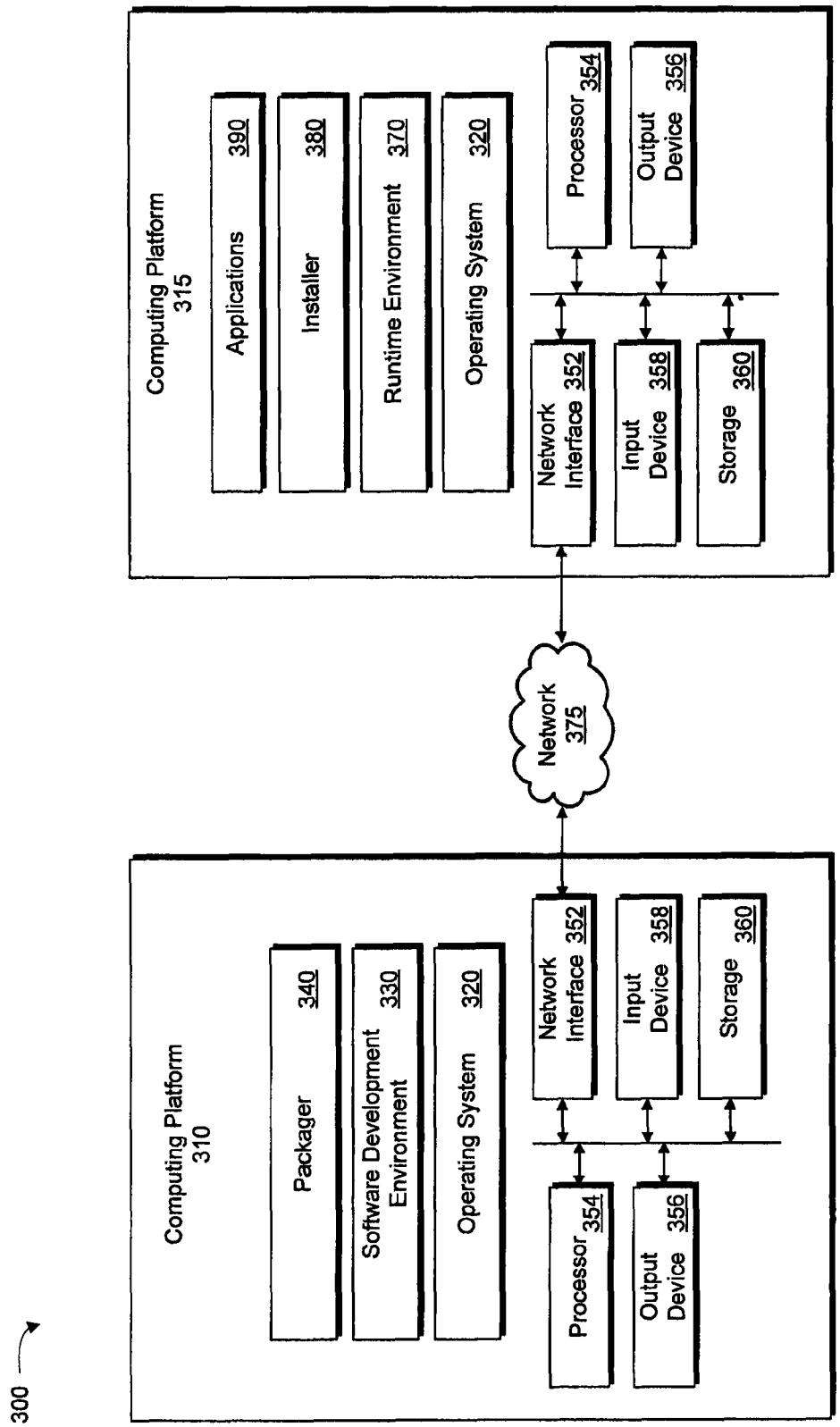
FIG. 3A is a block diagram showing an example data processing environment.

FIG. 3A shows an example data processing environment 300 in which an application can be developed and installed. Separate computer platforms 310 and 315 each include hardware and software. The computer platform 310 can be configured as an application development and distribution computer, while the platform 315 can be configured as a target installation computer (e.g., an end-user computer). The computer platforms can be geographically dispersed and operatively coupled via a network 375. The network 375 can include one or more telecommunications networks, such as computer networks, telephone or other communications networks, the Internet, etc. The network 375 can include a shared, public, or private data network encompassing a wide area (e.g., WAN) or local area (e.g., LAN).

In the example configuration shown in FIG. 3A, the hardware on the computer platforms 310 and 315 can include one or more of a network interface 352, a processor 354, an output device 356, an input device 358 and a storage 360. One or more system buses can interconnect these components. The number, identity and arrangement of these elements are not limited to what is shown, and additional and/or different elements can be contained in or coupled to the elements shown. Further, the platforms 310 and 315 can include fewer components than what is shown. Although depicted with similar components, the platforms 310 and 315 can be configured differently, each platform having additional, fewer or different elements than what is shown in the figure.

The network interface 352 may facilitate connectivity with a network, such as the network 375. Network interface 352 can be any appropriate wireline (e.g., IEEE (Institute of Electrical and Electronics Engineers, Inc.) 1394, Universal Serial Bus (USB), etc.) or wireless (e.g., IEEE 802.11™, BLUETOOTH®, IrDA®, etc.) mechanism for facilitating unidirectional or bidirectional transmission of data between the computer platform and the network 375. The network interface 352 can include one or more network cards and/or data and communication ports.

The processor 354 can execute instructions from storage, route information among components of the computer platform, and/or perform various operations on data. Each of the platforms 310 and 315 can include any number of general- and/or special-purpose processors, which can operate collaboratively or independently. In some examples, the processor 354 can include one or more application specific integrated circuits (ASICs) and/or various other circuitry. The processor 354 can include various logical elements and architectures (e.g., the von Neumann architecture, parallel architectures, etc.) and can perform various types of computational operations, such as sequential computation and parallel computation.

The output device(s) 356 can present text, images, video, audio, or any other type of information. Examples of the output device 356 include, video display devices, audio display devices, printers, and the like. The output device 356 can display user interface information for various software applications and tools running on the computer platform, as well as the operating system programs necessary to operate the system. The output device 356 can present information by way of a cathode ray tube, liquid crystal, liquid crystal on silicon, light-emitting diode, gas plasma, laser, or other type of display mechanism. The output device 356 can also be configured to receive, generate and/or present holographic or other visual representations. The output device 356 can be configured to audibly present information, and it can include suitable components for receiving and presenting audio signals. Each of the platforms 310 and 315 can include any number of similar or different output devices.

The input device(s) 358 can include components such as a keyboard, a mouse, a stylus, a pointing device, a joystick, and/or a touch screen. The input device 358 can also include audio- or video-capture devices (e.g., video cameras, microphones, etc.) and/or various sensors for capturing and processing emissions (e.g., thermal, motion, sound, etc.). It can also include one or more information reading devices (e.g., scanners, disk drives, etc.) and/or input ports. Each of the platforms 310 and 315 can include any number of similar or different input devices. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The storage 360 can provide mass storage, working (e.g., cache) memory, and/or buffer space for the system. The storage 360 can be implemented using a variety of suitable memory elements. The memory elements can include, for example, solid state elements, optical elements, polymer elements, magnetic elements, and/or organic elements (e.g., crystals). The memory elements can be volatile or non-volatile and can be randomly or sequentially accessed. The storage 360 can include random access memory (RAM), flash RAM, read-only memory (ROM), erasable programmable read-only memory (EPROM), and electrically erasable programmable read-only memory (EEPROM). The storage 360 can include one or more fixed disk drives (e.g., a hard drive, RAID storage, etc.) and one or more removable disk drives (e.g., a CD-ROM drive, DVD drive, etc.). The storage 360 can also include one or more data repositories (e.g., relational, distributed and/or object-oriented databases), which can be local and/or remote to the platform. In some examples, the storage 360 can include one or more local and/or remote network-based storage architectures, such as a storage area network (SAN). Each of the platforms 310 and 315 can include or interact with any number of individually configured storage elements 360.

The storage 360 can store program code for various applications, an operating system 320, an application-programming interface, application routines, middleware components, and/or other executable instructions. The storage 360 can include program code and information for communications (e.g., TCP/IP communications), middleware components, kernel and device drivers, invariant low-level systems code, data for basic input and output, and various configuration information.

In some implementations, the storage 360 includes at least one computer readable medium, which tangibly embodies one or more computer programs. The computer programs can contain instructions that, when executed by a processor, implement various methods (such as those described below) and/or systems. Computer readable medium refers generally to any type of computer program, apparatus and/or device (e.g., magnetic discs, optical disks, memory, Programmable Logic Devices (PLDs)) used to provide machine instructions and/or data to a processor. Computer readable media suitable for storing computer programs and data can include forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

As shown in FIG. 3A, the application distributor's computer 310 includes an operating system 320 and a software development environment 330, which can include and/or leverage a packager 340. The operating system 320 can include any suitable OS for managing computing resources and hosting applications (e.g., WINDOWS® OS, MAC® OS, UNIX® OS, LINUX® OS, and the like).

The software development environment 330 can include a software development kit (SDK), such as the Adobe® AIR™ SDK or the Adobe Flex® 3 SDK available from Adobe Systems Incorporated of San Jose, Calif. The SDK can include various application development frameworks and/or web development tools, such as FLEX™ BUILDER™ software and DREAMWEAVER® software available from Adobe Systems Incorporated of San Jose, Calif. The software development environment 330 can be used to create cross-platform applications, such as Adobe® AIR™ applications. It can also be used to create platform dependent applications (e.g., applications configured for a specific computer platform).

The packager 340 can receive created applications and generate application packages and installation files, which are eventually sent to the target computing platform 315. The installation file can include a native installation package associated with a specific computer platform, or it can include a cross-platform installation package. In some implementations, the packager 340 can generate distribution files intended for signing systems (not shown), which in turn can apply signatures and generate installation files.

One or more components (e.g., the packager 340) on the distributor's computer 310 can be configured to generate migration signatures. For example, the package 340 can accept as input a signed file (e.g., a signed .air file) and produce as output a file with both a package signature (e.g., the package signature 220) and a migration signature (e.g., the migration signature 250).

The target computing platform 315 includes a runtime environment 370, in which applications (such as applications 390) can operate. In some examples, the runtime environment 370 can include a cross-platform runtime environment, such as the Adobe® AIR™ software, provided by Adobe Systems Inc. of San Jose, Calif. Cross-platform software can rely on a virtual machine, such as the JAVA® Virtual Machine (JVM) (available from Sun Microsystems, Inc.), to run on the target platform 315. The JVM can provide a runtime environment and an interpreter for a number of operating systems.

The runtime environment 370 uses the operating system 320 on the target computer 315 to interact with other elements of the computer 315. The runtime environment 370 can provide various utility services for use by applications that run in the environment. These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provide using a runtime library. Moreover, the runtime environment 370 can include a cross-platform application program interface (API) that provides services to applications running in the runtime environment 370 and abstracts details of various hardware and OS platforms on which the runtime environment 370 has been configured to operate.

In some implementations, the runtime environment 370 can load an application from an encoded representation of the application. The encoded representation can have a predefined syntactic structure such as a programming language (e.g., source code) or can include well defined virtual instructions (e.g., platform-independent bytecode, such as Macromedia Flash® bytecode). To load such applications, the application runtime environment 370 can decode the encoded representation of the application into executable instructions and then execute those instructions.

In some examples, the application runtime environment 370 can create application identifiers for applications using digital signatures associated with the applications. These application identifiers can be used to facilitate inter-application communications, to provide application-specific secure storage in the computer platform, and/or to support application installation and update functionality.

The runtime environment 370 can serve as and/or leverage an application installation environment for applications. Thus, as shown in FIG. 3A, the runtime environment 370 can include or leverage an installer 380. The installer 380 can include any mechanism operable to unpack (e.g., decrypt and uncompress) installation packages in order to install application components. The installer 380, or portions(s) thereof, can also be included in the package itself. In some examples, the installer 380 can unpack cross-platform installation packages and write them directly to disk using code provided by the software developer and/or the developer of the cross-platform package format. In some examples, an OS installer can be used to process native installation packages. For example, INSTALLSHIELD® software can be used to produce .msi files for installation on WINDOWS® machines, and a different software tool can be used to produce .pkg files for installation on MAC® machines.

As shown in FIG. 3A, the target computer 315 can include various applications 390 that run in the runtime environment 370. These applications 390 can include various computer programs, which contain instructions executable by one or more processors (e.g., the processors 354). Computer programs consistent with this disclosure can be implemented in various programming languages, such as high- or mid-level procedural and object-oriented programming languages (e.g., C, C++, Java, JavaScript, PHP, Visual Basic, etc.), low-level assembly languages (Intel 80×86, ARM, etc.)

and/or various other languages. In some examples, the applications 390 can include Adobe® AIR™ applications, which can be created using various types of source files, such as SWF files, HTML files, JavaScript files, JPEG files, etc.

Figure 3B:
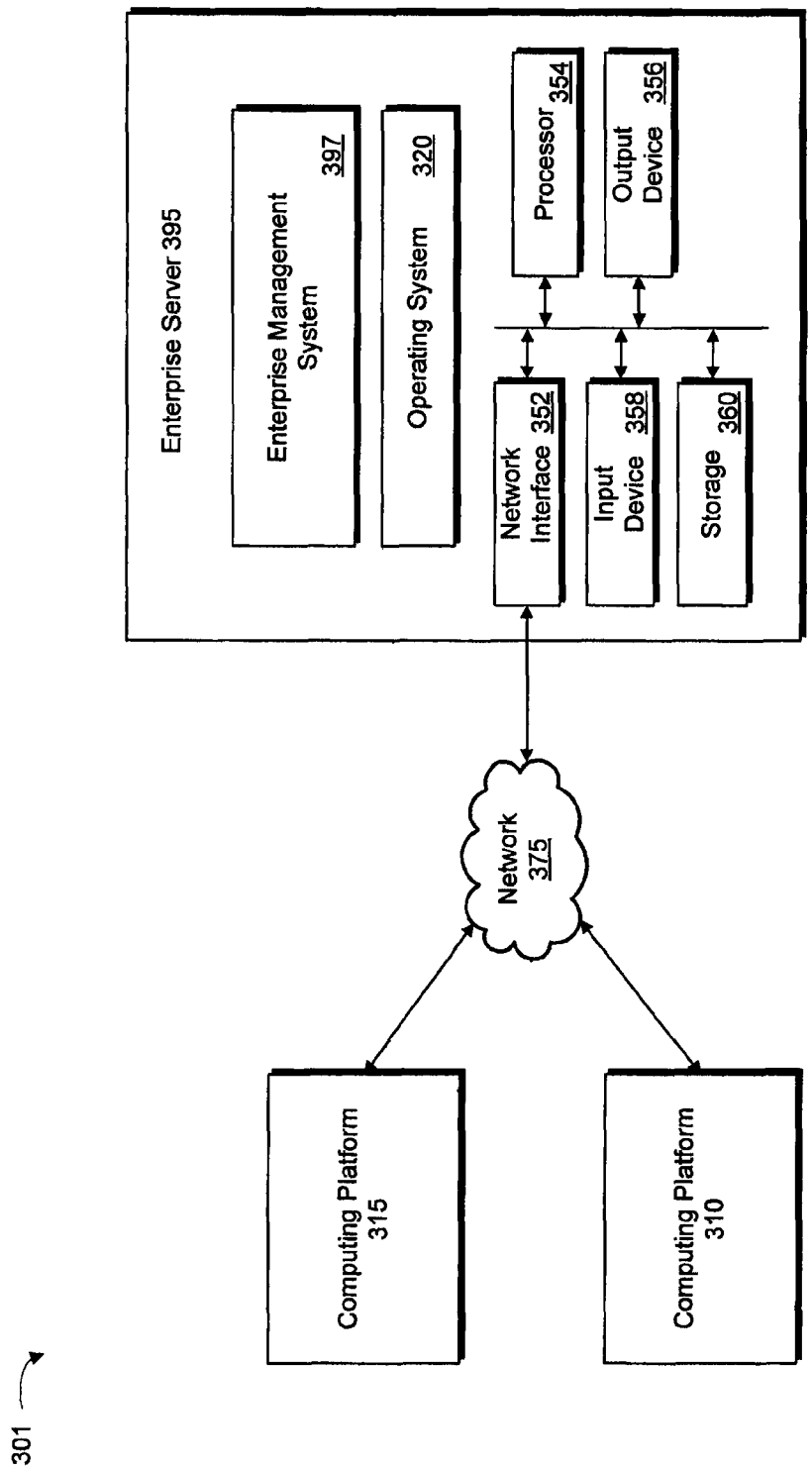
FIG. 3B is a block diagram showing another example data processing environment.

FIG. 3B shows another example data processing environment 301 in which an application can be developed and installed. Similar to the environment 300 in FIG. 3A, the environment 301 can include separate computer platforms 310 and 315. The computer platform 310 can be configured as an application development and distribution computer, while the platform 315 can be configured as a target installation computer (e.g., an end-user computer). The environment 301 in FIG. 3B can include an enterprise server 395, which can be operatively coupled to the network 375. The computer platforms 310 and 315 and the server 395 can be geographically dispersed and operatively coupled via the network.

The enterprise server 395 can include various hardware and software. In some examples, the enterprise server 395 can include hardware similar to that on the platforms 310 and 315, such as a network interface 352, a processor 354, an output device 356, an input device 358 and a storage 360. The number, identity and arrangement of these elements are not limited to what is shown, and additional and/or different elements can be contained in or coupled to the elements shown. Further, the server 395 can include fewer components than what is shown. Moreover, the platforms 310 and 315 and the server 395 can be configured differently, each having additional, fewer or different elements than what is shown in the figure.

The enterprise server 395 can include an operating system 320 and an enterprise management system 397. The operating system 320 can be any suitable operating system. The enterprise management system 397 can include various systems management software components, which can centrally administrate, configure and/or provide services to one or more distributed client systems, such as the computing platform 315. In some examples, the enterprise management system 397 can be configured to distribute software (e.g., received from the computing platform 310) to the computing platform 315. In some implementations, the enterprise management system 397 can invoke the installer 380 on the computing platform 315, which in turn can unpack installation packages in order to install application components.

Figure 4:
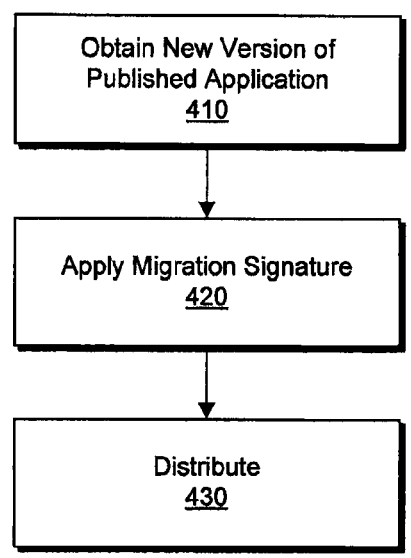
FIG. 4 is a flow diagram showing an example application update distribution process.

FIG. 4 is a flow diagram showing an example application update distribution process 400 consistent with this disclosure. The process 400 can be performed by one or more elements in the data processing environment 300. The process 400 can be performed by one or more processors (e.g., processor 354) executing one or more instructions from storage. The process 400 can involve obtaining 410 a new version of a published application; applying 420 a migration signature; and distributing 430 the new version.

The process 400 can obtain 410 a new version of a published application. This can involve creating a new version of a published application, which can be either a platform dependent application or a cross-platform application. Creating a new version can involve, for example, a software developer making changes to an already published application. The changes can affect features and functionality of the published application itself, or the changes can involve switching to a different type of code signing certificate without making any other changes related to the application. For example, the developer may wish to switch from a self-sign code signing certificate to a CA-issued code signing certificate. The new version of the published application can be created using various software development tools, such as FLEX™ BUILDER™ software and DREAMWEAVER® software available from Adobe Systems Incorporated of San Jose, Calif.

In some examples, creating a new version of the published application can involve changing an association between the application and a publisher (for example, as determined by a certificate used to digitally sign the application) to another application-publisher association. For example, a new version of the published application can be created in order to reflect an acquisition of the application publisher by another publisher and/or a purchase of the application by a new publisher. In these scenarios, creating a new version of the published application can involve updating the application-publisher association to reflect the change. The creating can involve switching from one code signing certificate to another code signing certificate, where the certificates can be of different types (e.g., a switch from self-signed to CA-issued) and can identify different publishers, without making any other changes related to the application.

Obtaining 410 a new version of the application can involve obtaining an installation file corresponding to a published application already installed on a computing platform. The obtained installation file can be signed with a package signature (e.g., package signature 230) that covers the entire installation file and protects the file from tampering and protects the identity of the application publisher (e.g., the developer). The obtained installation file can include a new version associated with the published application. The installation file can include changes that affect features and functionality of the published application itself, or it can effect a signature change (a switch to a different type of code signing certificate) without making any other changes related to the application.

The process 400 then applies 420 a migration signature, which can involve packaging the new version of the published application with a migration signature. The migration signature can be used to attest that a new version of the application is a valid update to a version of the application already signed with a signature that matches the migration signature.

In some examples, applying 420 the migration signature can involve assembling a new version of the application into an installation package. The installation package can be signed with a package signature (e.g., package signature 230) that covers the entire installation file and protects the file from tampering and protects the identity of the application publisher (e.g., the developer). After the package signature is applied, the migration signature can be applied to the newly signed installation file, to generate a dual-signature installation file. The migration signature covers the package signature, attesting that the installation file is a valid update to a version of the application already signed. By covering the package signature, the migration signature approves the migration between signature formats.

Applying 420 the migration signature can involve applying a migration signature to an obtained installation file to generate a dual-signature installation file. The obtained installation file can be signed with a package signature and can include a new version of a previously installed application. The migration signature can cover the package signature of the obtained installation file and match an original signature already associated with the installed application. In some examples, the original signature can be associated with a self-signed certificate and the package signature can be associated with a CA-issued certificate. The migration signature can validate the package signature for association with the published application.

As previously noted, packaging and signing can be performed separately. For example, application files can be packaged at a packager's computer to form a distribution file. The distribution file can then be sent to a signer's computer, where the distribution file can be converted to an installation file by applying a package signature and the migration signature.

The process 400 then distributes 430 the new version for use on a target system. This can involve sending the dual-signature installation file from a developer system (e.g., platform 310) to an installer's computer (e.g., platform 315), where the application can be installed (e.g., decrypted and uncompressed) from the installation file. The installer's computer can include appropriate installation and runtime tools for installing and supporting operation of the application.

Figure 5:
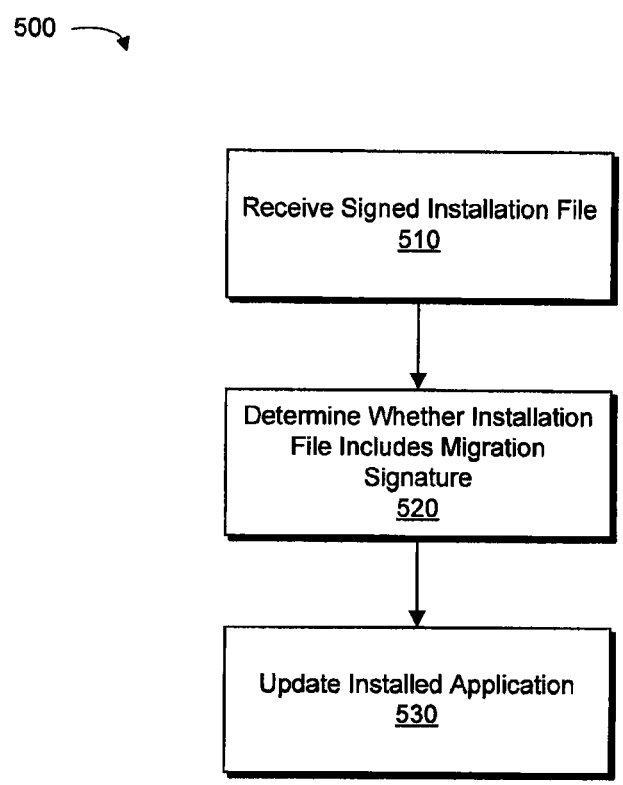
FIG. 5 is a flow diagram showing an example application installation process.

FIG. 5 is a flow diagram showing an example application installation process 500. The process 500 can be performed by one or more elements in the data processing environment 300. The process 500 can be performed by one or more processors (e.g., processor 354) executing one or more instructions from storage. The process 500 can involve receiving 510 an installation file digitally signed with a first package signature; determining 520 whether the received installation file includes a migration signature; and updating 530 an installed software application from the received installation file based on results of the determination.

The process 500 receives 510 an installation file. This can involve an end-user system (e.g., computing platform 315) receiving an installation file as an update related to an application, which can be already signed with an original code signing certificate and installed on the end-user system. The received installation file can include an update to application functionality and/or an update to an association between the application and a publisher (e.g., as indicated in the original certificate). For example, the installation file can include an update that reflects an acquisition of the application publisher by another publisher and/or a purchase of the application by a new publisher. In some examples, the update affects the application-publisher association without otherwise affecting the application.

The received installation file can be digitally signed with a package signature. This package signature can be associated with, for example, a CA-issued code signing certificate having a particular public key. The public key corresponding to the package signature can be different than that of the original signature applied to the installed application.

The process 500 then determines 520 whether the received installation file includes a migration signature. This can involve determining whether the received file includes a digital signature that (1) covers the package signature and (2) matches the original signature associated with the software application already installed on the end-user system, in order to confirm that the received installation file includes a valid update to the installed software application.

Determining whether a migration signature matches the original signature can involve for example (1) comparing public signing keys associated with the signatures, (2) comparing shared keys associated with the signatures (e.g., in a shared key signing scheme) and/or (3) comparing publisher identifiers. Comparing public keys can involve determining whether keys included in the certificates associated with the migration signature and the original signature are the same. Comparing shared keys can involve comparing shared keys that are pre-exchanged or established using asymmetric techniques. Comparing publisher identifiers can involve accessing and comparing publisher identifiers that are derived (e.g., by the runtime environment) from the migration signature and the original signature.

A publisher identifier can include an identifier that is unique to a particular digital certificate, such that using the same certificate for multiple applications yields the same publisher identifier for each application. The publisher identifier for a given application can be computed, for example, by processing (e.g., hashing) one or more portions or fields of the certificate used to sign that application, such as certificate owner names (e.g., certificate subjects, distinguished names, alternative names or DNS entries).

In some examples, public key information can be combined with one or more certificate owner names to form the publisher identifier. The publisher identifier can be computed, in some implementations, as a combination of hash values, including for example the hash of a root certificate's public key, the hash of the canonicalized distinguished name(s) of one or more intermediate CAs, and the hash of the canonicalized distinguished name of an end entity certificate.

If a CA-issued certificate is renewed, the fields used to compute the publisher identifier, as well as the root certificate, should remain the same in the renewal certificate in order for the publisher identifier to remain constant. Typically, when a CA renews a certificate, the renewal certificate identifies the certificate owners (and thus the application publisher) the same way as before. A renewal certificate, therefore, will typically yield the same publisher identifier as the certificate being renewed even if the public key changes so long as the certificates are so related. If a self-signed certificate is replaced, a new key pair can be used. Thus, a replacement self-sign certificate will yield a different publisher identifier than before.

In some implementations, determining whether a migration signature matches the original signature can involve consulting an external or third-party source. In such implementations, the external source can provide information that indicates whether the signatures match.

The process 500 updates 530 an installed application based on results of the determination 520. Generally, in some examples, the updating 530 can involve checking the presence of the package signature and the migration signature. If only the package signature is present, then the process 500 only updates an installed application signed with a matching signature. For example, the process 500 can update an application that is signed with an original signature having a public signing key that is the same as the key associated with the package signature. If both the package signature and the migration signature are present, however, then the process 500 can use the received installation file as an update related to an application having an original signature that matches either certificate.

In some examples, if the received installation file includes a migration signature that covers the package signature and matches the original signature associated with the software application already installed on the end-user system, then the process 500 updates the installed software application from the received installation file. Updating (530) an installed application can involve utilizing an specific API that allows the installed software application to update itself. Such an API can be provided by a runtime environment on the end-user system. In some implementations, updating (530) the installed application can involve an enterprise software management system (e.g., the enterprise management system 397) invoking software that performs installation (e.g., the installer 380). The updated application can be functionally different from the originally-installed application, or it can be functionally identical to the originally-installed application except for a change in code signing certificates, which can be different in type and/or identify different publishers.

The updating 530 can involve determining whether the package signature of the received installation file matches the original signature associated with an installed software applications. When the package signature matches an original signature of the installed application, the process 500 can update the installed software application from the received installation file. If no match is found, the process 500 can terminate without updating the installed software application.

In some examples, the updating 530 can also involve changing the certificate information used to identify an application such that feature updates to the application are signed by only the new certificate (i.e., the old signature becomes obsolete).

In some examples, applications can be associated with unique application identifiers. The application identifiers can be used for various purposes, such as to facilitate inter-application communications, to provide application-specific secure storage, and/or to support a generic installer mechanism. When applications are migrated, the application identifiers can change. Thus, in some cases, after an installed application is updated 530, its application identifier can change.

Figure 6:
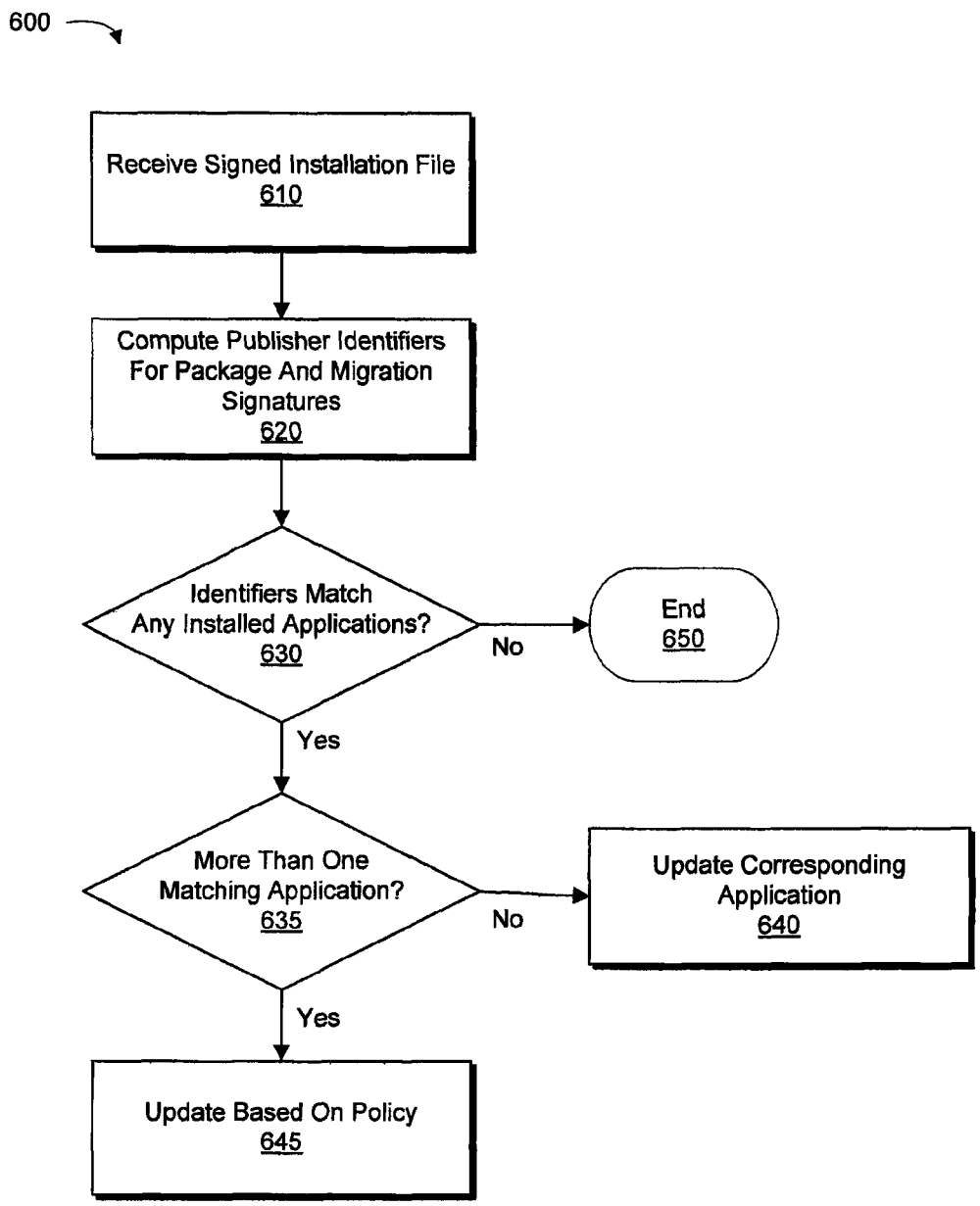
FIG. 6 is a flow diagram showing another example application installation process.

FIG. 6 is a flow diagram showing another application installation process 600. The process 600 can be performed by one or more elements in the data processing environment 300. The process 600 can be performed by one or more processors (e.g., processor 354) executing one or more instructions from storage. In general, the process 600 can involve receiving 610 an installation file digitally signed with a package signature and a migration signature; computing 620 publisher identifiers for the package signature and the migration signature; determining (stages 630 and 635) whether the computed publisher identifiers match the publisher identifiers of any installed applications; and updating (stages 640 and 645) installed applications based on results of the determination.

The process 600 can receive 610 an installation file having a package signature and a migration signature. This can involve an end-user system (e.g., computing platform 315) receiving an installation file intended as an update to an application already signed with an original signature and installed on the end-user system. The package signature can, for example, be associated with a CA-issued certificate, and it may cover the entire installation file. The migration signature can be applied after the package signature, and it can be created using a different certificate.

The process 600 can compute 620 publisher identifiers for the package signature and the migration signature. This can involve, for examples, processing (e.g., hashing) one or more portions of the certificates associated with the signatures (e.g., certificate owner names), as described above.

The process 600 then determines 630 if the publisher identifiers match the publisher identifiers of any installed applications. If there are matches, the process 600 can determine 635 whether there is single match or more than one match. If only a single match is found, then the process can update 640 the corresponding application having that identifier. If more than one match is found, however, then the process 600 can update 645 the applications based on platform-dependent policies, which may be predetermined by the application publisher. For example, in one scenario, the process 600 can update the applications that match the package signature and uninstall the applications that match the migration signature. In another scenario, the process 600 can update the application that matches the package signature without affecting other applications. Various other decisions can be made as well, depending on the platform. If the computed publisher identifiers for the package and migration signatures do not match the publisher identifiers of any installed applications, then the process 600 may end 650 without updating any application from the received installation file.

The sequences of events shown in FIGS. 4-6 are examples and not intended to be limiting. Other processes can therefore be used and, even with the processes 400, 500 and 600 depicted in FIGS. 4-6, events can be re-ordered, added and/or removed. Furthermore, the elements of the processes can overlap and/or can exist in fewer stages than the number shown in the figures. In some examples, processes can be re-arranged and configured to accommodate and/or exploit multitasking and parallel processing techniques and/or other aspects of various system architectures.

FIG. 7 shows aspects of example package and migration signatures, which in some examples can be consistent with the signatures 220 and 250 shown in FIG. 2. In some implementations, a migration signature can be used to migrate an Adobe® AIR™ application associated with an .air file. Migration can be accomplished by including in at least one version of the application two signatures in the air file, one made with each key. When the installer encounters files with these dual signatures, it can migrate the application from the old to new identity association. One or more components (e.g., the packager 340) on the distributor's computer 310 can be configured to accept as input a signed file associated with an application (e.g., a signed .air file) and produce as output a file with these dual signatures.

As shown in FIG. 7, the first signature 710 can be associated with an identifier of ID="PackageSignature" and can be created using the new key (712). This first signature can cover each file in the package. The second signature 720 can have an identifier of ID="MigrationSignature." The migration signature 720 can be created with the old key (722) and can cover the signature value of the first signature 710. This can serve to verify that the owner of the old key is accepting the transition to the new key. In some implementations, both signatures 710 and 720 can be time-stamped (714, 724). In some examples, time-stamping can be a default setting (e.g., in the packager 340) but can be overridden to allow for off-line signing.

FIG. 7 is an example and is not intended to be restrictive. Thus, other implementations of package and migration signatures can be used without departing from the scope of this disclosure. Further, aspects shown in FIG. 7 are not limited to implementations involving Adobe® AIR™ applications and .air files. One or more of the illustrated aspects can therefore be used in conjunction with other types of applications and associated files.

Figure 8:
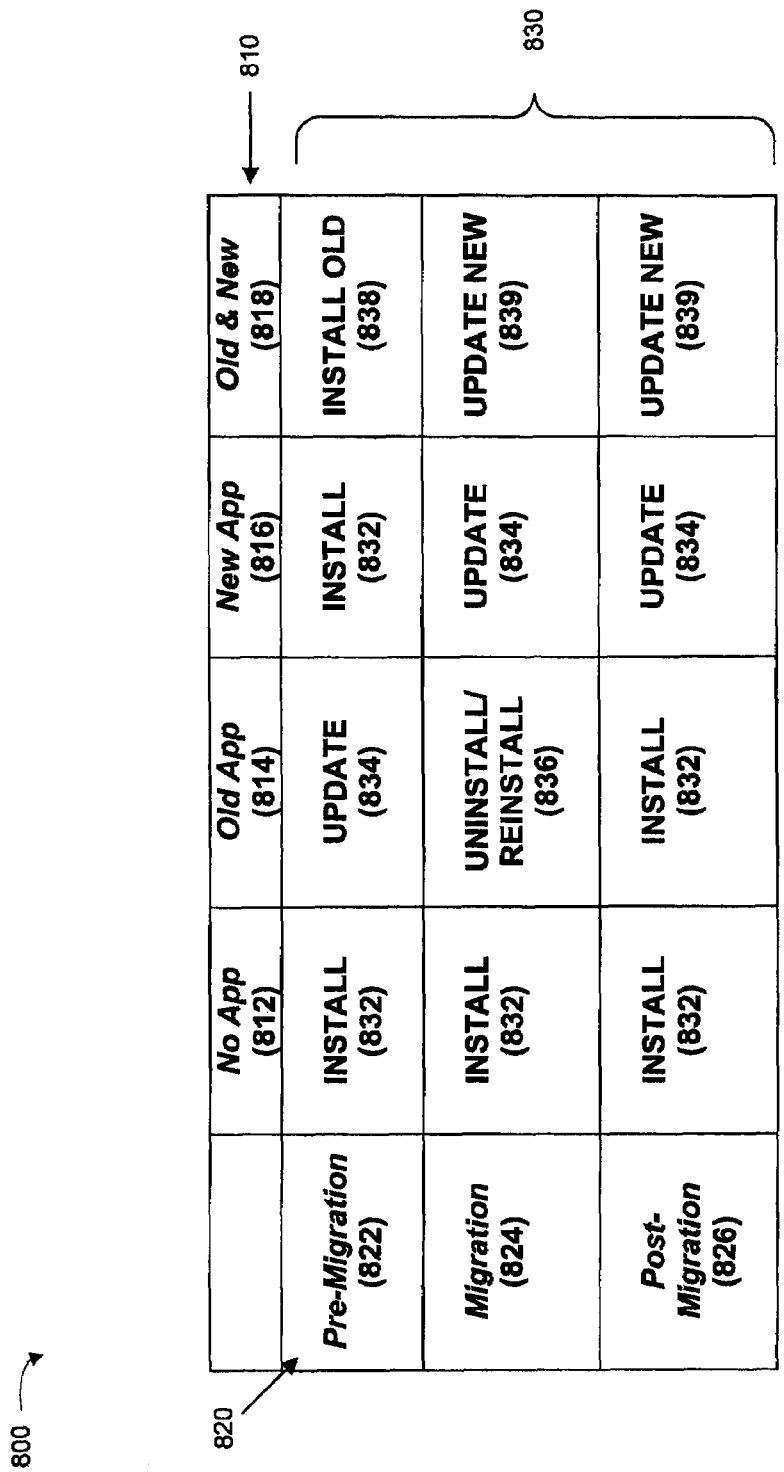
FIG. 8 is a table showing example application installation scenarios.

FIG. 8 depicts a table 800 showing example installation scenarios, which can be consistent with or included in the updating stage 510 of the process 500 shown in FIG. 5 and/or one or more of the determining (630 and 635) and updating (640 and 645) stages of the process 600 shown in FIG. 6. In some implementations, application signature validation code (e.g., included in the installer 380) can look for and validate a migration signature. When the migration signature is present, the installer can use the publisher identifier (or keys) from both certificates to determine the appropriate actions, which can be consistent with what is shown in the table 800 of FIG. 8. The elements shown in FIG. 8 are examples and not intended to be restrictive. Other installation scenarios can therefore be used without departing from the scope of this disclosure.

The table 800 shows various installation states 810: a No App 812 state, an Old App 814 state, a New App 816 state and an Old & New 818 state. The table also shows various types of installation packages 820 (e.g., .air files) that can be encountered during installation (e.g., by the installer 380 on the target platform 815): a Pre-Migration 822 package, a Migration 824 package and a Post-Migration 826 package. The table 800 further shows outcomes 830 in each scenario: Install (832), Update (834), Uninstall/Reinstall (836), Install Old (838) and Install New (839).

In the table 800, the installation state 812 (No App) refers to a situation where no application signed with either the old or new certificate is installed on the target platform. The installation state 814 (Old App) can refer to a state in which an application is installed on the target platform and is signed with an old signature (using an old key). The installation state 816 refers to a state in which an application is installed on the target platform and is signed with a new signature (using a new key). This installed application, in some examples, can be signed with a migration signature in addition to the new signature. The installation state 818 refers to a state in which both an old version of an application (signed with the old key) and a new version of the application (signed with the new key) are found on the target platform (e.g., the platform 315).

In the table 800, the Pre-Migration installation package 822 refers to an installation package signed prior to any migration of the application. The Migration installation package 824 refers to an installation package having both a new package signature (using a new key) and a migration signature (covering the new package signature and using the old key associated with the old signature). For example, referring to FIG. 2A, the Migration installation package 824 can have both the package signature 220 and the migration signature 250. The Post-Migration installation package 826 refers to an installation package having only the new signature (using the new key). This type of installation package can be created to update an application after it is has been migrated.

As shown in table 800, if a Pre-Migration 822 installation package is encountered and nothing is installed (812), then the installer (e.g., the installer 380) can install 832 the application from the package 822 on the target platform. If a new version of an application signed with the new signature (using the new key) is installed, then the application associated with the Pre-Migration 822 installation package can be installed on the target platform as a separate application. If an application signed using the old key is installed (814), then the application can be updated 834 from the installation package. If both old and new versions of the application are installed, then the old version of the application can be installed 838 from the Pre-Migration package 822.

If a Migration 824 installation package is encountered and nothing is installed (812), then the application can be installed from the installation package 824. If an application signed with the new signature (using the new key) is installed (816), then the application can be updated 834 from the Migration 824 installation package. If an old version of an application signed using the old key is installed (814), then the old version can be uninstalled and a version can be reinstalled from the Migration 824 installation package. This can appear to a user as an update of the old version. If both old and new versions of the application are installed (818), then the new version of the application can be updated 839 from the Migration 824 package.

If a Post-Migration 826 installation package is encountered and nothing is installed (812), then the installer can install the application from the installation package 826. If a version signed with the new signature is installed (816), then the application can be updated from the Post-Migration 826 installation package. If a version signed using the old key is installed (814), then the application associated with the Post-Migration 826 installation package can be installed 832 on the target platform as a separate application. If both old and new versions of the application are installed (818), then the new version of the application can be updated 839 from the Post-Migration 826 package.

As is shown in table 800, once the application with the migration certificate is installed, older pre-migration versions of the application can be installed and appear as separate applications. Further, if an old version of a migrated application is encountered, the application can appear to be new. If an old version of an application is re-installed and then re-migrated, it can cause the migrated application to be updated. Additionally, in some implementations, a new application may not have access to local storage or encrypted local store data of the previous version of the application (from earlier certificates). In some examples, a migrated application can determine a path to access the old local store location on its own and access it, for example, using a filesystem API. In some examples, a publisher identifier for the old version can be computed and used to provide access to the old local store, encrypted local store data, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method for improving security by securely changing certificate information of an installed software application, the method comprising:
receiving an installation file to update the installed software application, wherein the installed software application is digitally signed with a first signature that certifies a previous application publisher, and further includes certificate information that identifies the previous application publisher, and wherein the installation file is digitally signed with at least a second signature that certifies a new application publisher;
determining that the received installation file digitally signed with at least the second signature is further digitally signed with a migration signature that matches the first signature to confirm that the received installation file includes a valid update signed by the previous application publisher;
updating the installed software application based on the determination that the received installation file is digitally signed with the migration signature that matches the first signature, wherein the updated software application is digitally signed with at least the second signature that certifies the new application publisher; and changing the certificate information that identifies the previous application publisher to updated certificate information that identifies the new application publisher, based on the determination that the received installation file is digitally signed with the migration signature that matches the first signature, such that valid updates to the updated software application can only be signed by the new application publisher.

2. The method of claim 1, wherein the first signature is associated with a self-signed security certificate, and wherein the second signature is associated with a certificate issued by a certificate authority.

3. The method of claim 1, wherein the first package signature is associated with a first public signing key, and the second signature is associated with a second public signing key that is different than the first public signing key.

4. The method of claim 1, wherein the determining comprises:
determining a match between a first identifier generated from the migration signature of the received installation file and a second identifier generated from the first signature of the installed software application; and
based on the determined match, determining that the update is valid and signed by at least the previous application publisher.

5. The method of claim 4, wherein the second signature and the first signature are associated with different public signing keys, and wherein the method further comprises:
determining a match between the migration signature of the installation file and the first signature of the installed software application; and
updating the installed software application utilizing the received installation file based on determined match.

6. The method of claim 5, wherein determining the match is based on another match between a first identifier generated from the migration signature and a second identifier generated from the first signature of the installed software application.

7. The method of claim 1, wherein the software application is installed and updated in a cross-platform runtime environment.

8. The method of claim 1, wherein the received installation file is configured to associate the installed software application with the new application publisher instead of the previous application publisher.

9. The method of claim 8, wherein the received installation file is further configured to associate the installed software application with the new application publisher, such that future updates to the installed software application must be signed by the first package signature.

10. A system for securely changing certification information of an installed software application configured to operate within an application runtime environment, the system comprising:
a processor; and
a non-transitory storage medium coupled with the processor, the non-transitory storage medium including instructions operable to cause the processor to perform operations comprising:
receiving an installation file to update an installed software application, wherein the installed software application is digitally signed with a first signature that certifies a previous application publisher, and further includes certificate information that identifies the previous application publisher so that valid updates to the installed software application can only be signed by the previous application publisher, and wherein the installation file is digitally signed with at least a second signature that certifies a new application publisher;
determining, within the application runtime environment, that the received installation file digitally signed with at least the second signature is further signed with a migration signature that matches the first signature to confirm that the received installation file includes a valid update related to the installed software application signed by the previous application publisher;
updating the installed software application based on the received installation file being digitally signed with the migration signature that matches the first signature, wherein updating includes changing the certificate information to identify the new application publisher instead of the previous application publisher based on the determination that the received installation file is digitally signed with the migration signature that matches the first signature,
so as to validate future installation files digitally signed with the second signature.

11. The system of claim 10, wherein the first signature is associated with a self-signed security certificate, and wherein the second signature is associated with a certificate issued by a certificate authority.

12. The system of claim 10, wherein the first signature is associated with a first public signing key and the second signature is associated with a second public signing key different from the first public signing key.

13. The system of claim 10, wherein the determining comprises:
determining a match between a first identifier generated from the migration signature of the received installation file and a second identifier generated from the first signature of the installed software application.

14. The system of claim 13, wherein the second signature of the received installation file and the first signature of the installed software application are associated with different public signing keys, and wherein the operations further comprise:
determining a match between the migration signature of the received installation file and the first signature of the installed software application; and
updating the installed software application utilizing the received installation file based on the determined match.

15. The system of claim 14, wherein determining the match is based on another match between a first identifier generated from the migration signature and a second identifier generated from the first signature.

16. The system of claim 10, wherein the software application is installed and updated in a cross-platform runtime environment.

17. The system of claim 10, wherein the received installation file is configured to:
at least associate the installed software application with the new application publisher instead of the previous application publisher.

18. The system of claim 17, wherein the received installation file is further configured to associate the installed software application with the new application publisher, such that future updates to the updated software application must be signed by the first signature.

19. A computer program product, encoded on a non-transitory storage medium, operable to cause a data processing apparatus to perform operations for improving security by securely changing certification information of an installed software application, the operations comprising:

receiving an installation file to update the installed software application, the installation file being digitally signed with a first signature that certifies a previous application publisher, and further includes certificate information that identifies the previous application publisher so that only updates signed by the previous application publisher are valid, and wherein the installation file is digitally signed with at least a second signature that certifies a new application publisher;

determining that the received installation file digitally signed with the second signature is further digitally signed with a migration signature that matches the first signature to confirm that the received installation file includes a valid update signed by the previous application publisher;

updating the installed software application based on the determination that the received installation file is digitally signed with the migration signature that matches the first signature; and changing the certificate information that identifies the previous application publisher to updated certificate information that identifies the new application publisher, based on the determination that the received installation file is digitally signed with the migration signature that matches the first signature, so that only updates signed by the new application publisher are valid.

20. The computer program product of claim 19, wherein the first signature is associated with a self-signed security certificate, and wherein the second signature is associated with a certificate issued by a certificate authority.

21. The computer program product of claim 19, wherein the first package signature is associated with a first public signing key, and the second signature is associated with a second public signing key that is different than the first public signing key.

22. The computer program product of claim 19, wherein the determining comprises:

determining a match between a first identifier generated from the migration signature of the received installation file and a second identifier generated from the first signature of the installed software application; and based on the determined match, determining that the update is valid and signed by at least the previous application publisher.

23. The computer program product of claim 22, wherein the second signature and the first signature are associated with different public signing keys, and wherein the operations further comprise:

determining a match between the migration signature of the installation file and the first signature of the installed software application; and updating the installed software application utilizing the received installation file based on the determined match.

24. The computer program product of claim 23, wherein determining the match is based on another match between a first identifier generated from the migration signature and a second identifier generated from the first signature of the installed software application.

25. The computer program product of claim 19, wherein the software application is installed and updated in a cross-platform runtime environment.

26. The computer program product of claim 19, wherein the received installation file is configured to:

associate the installed software application with the new application publisher instead of the previous application publisher.

27. The computer program product of claim 19, wherein the received installation file is further configured to associate the software with the new application publisher, such that future updates to the updated software application must be signed by the first package signature.

* * * * *